United States Patent [19]

Imperial

[11] Patent Number: 4,986,025
[45] Date of Patent: Jan. 22, 1991

[54] LANDSCAPE APPARATUS

[76] Inventor: William A. Imperial, 1039 Houghton Ct., San Jose, Calif. 95112

[21] Appl. No.: 470,363

[22] Filed: Jan. 25, 1990

[51] Int. Cl.$^5$ ............................................. A01G 13/02
[52] U.S. Cl. ............................................. 47/2; 47/25; 47/32; 47/33
[58] Field of Search ............ 47/2, 23, 24, 25, 32, 47/33, 9

[56] References Cited

U.S. PATENT DOCUMENTS

| | | | |
|---|---|---|---|
| 986,395 | 3/1911 | King | 47/33 |
| 2,785,508 | 3/1957 | Coleman Jr. | |
| 3,310,910 | 3/1967 | Titus | 47/33 |
| 4,154,022 | 5/1979 | Costanzo | 47/32 X |
| 4,308,688 | 1/1982 | Revane | 47/32 X |
| 4,502,244 | 3/1985 | Yoham | 47/25 |
| 4,539,800 | 9/1985 | Furmaga | |
| 4,584,789 | 4/1986 | Jean et al. | |
| 4,858,378 | 8/1989 | Helmy | 47/33 |

Primary Examiner—David A. Scherbel
Assistant Examiner—Jerrold D. Johnson
Attorney, Agent, or Firm—Leon Gilden

[57] ABSTRACT

An apparatus is set forth including a surrounding shield formed with a central aperture positionable about a central stalk or trunk portion of a shrub or tree growth. The apparatus includes four pie-shaped segments that are interlocked relative to one another utilizing lug members receivable within key-shaped openings of adjacent walls of the pie-shaped segments. The segments include a floor formed with a matrix of apertures therethrough. Each pie-shaped segment is defined by a perimeter wall defining a cavity with a pie-shaped container segment of complementary configuration received within a forward portion of the cavity, wherein the container segments are defined by a perimeter wall of a height greater than that defined by the pie-shaped segment walls for receiving additional plants therewithin is surrounding relationship relative to a main plant or alternatively receive fluid fertilizer and the like for treatment of the root system of an associated central plant. Additionally, pie-shaped segment inserts defining an enclosed chamber filled with a mineral oil and the like are positionable within each of the pie-shaped segment cavities for retention of heat during daylight hours and enabling dispensing of the heat during evening hours preventing premature freezing of a root system of an associated plant.

2 Claims, 4 Drawing Sheets

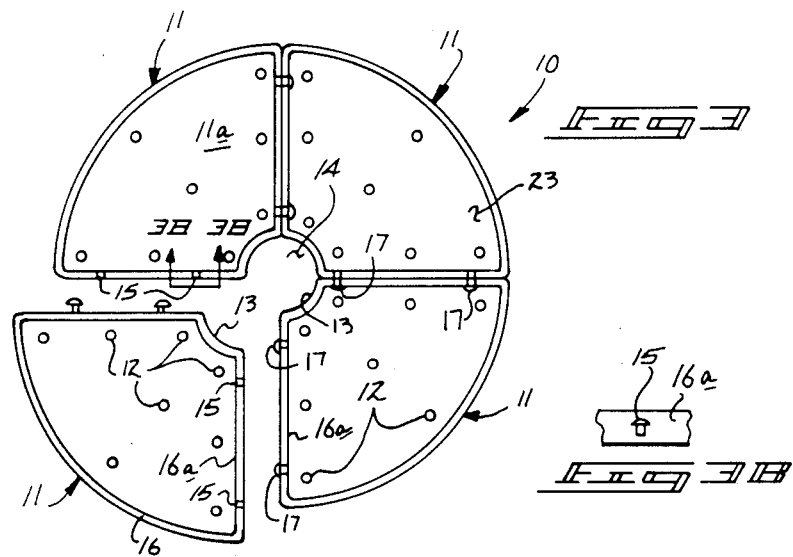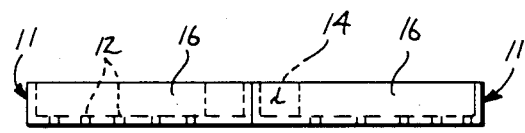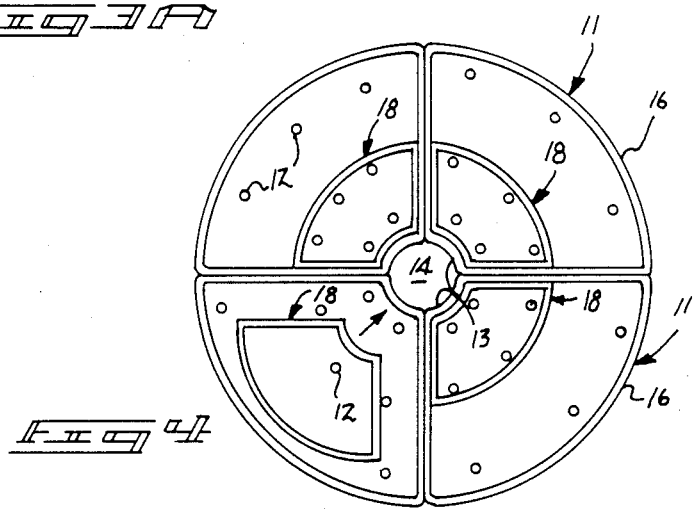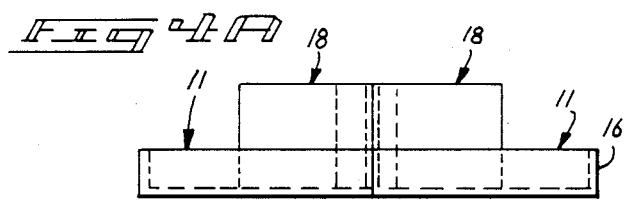

LANDSCAPE APPARATUS

BACKGROUND OF THE INVENTION

1. Field of the Invention

The field of invention relates to landscape apparatus, and more particularly pertains to a new and improved landscape apparatus wherein the same is securable in an interlocked relationship about an associated plant base to direct watering fluids thereto while simultaneously preventing undesirable growth of weeds and the like about a central plant.

2. Description of the Prior Art

Landscape apparatus of various types has been utilized in the prior art to provide a shield about a trunk portion of a plant, such as a tree. Prior art devices have generally been of a unitary type construction or have been formed of a flexible type material, wherein the instant invention is capable of being formed of rigid material to maintain its geometric integrity during use. Examples of the prior art include U.S. Pat. No. 4,502,244 to Woham wherein in an annular shield in surrounding relationship to an associated tree member provides a dual floor construction with a gap therebetween to enable directing of fertilizer fluid and the like therein to a root portion of the associated tree.

U.S. Pat. No. 4,308,688 to Revane sets forth a plurality of fiberglass sections for securement about a tree trunk of semi-annular configuration and is securable about the associated tree for protection thereof in prevention of weed growth thereabout.

U.S. Pat. No. 4,539,800 to Furmaga sets forth a partial metal frame for positioning about a shrub or the like for accepting trimmings and the like directed during a cutting operation onto the framework.

U.S. Pat. No. 4,584,789 to Jean, et al., sets forth an apparatus formed of plural segments of a generally conical configuration for positioning about a tree root system for promotion and development of micro-organisms within the ground about the root system.

U.S. Pat. No. 2,785,508 to Coleman provides a collar for positioning about a plant and the like wherein the member includes a downwardly turned peripheral lip interfitting over a flower pot as a protector for holding stems and the like associated with growth from the flower pot.

As such, it may be appreciated that there is a continuing need for a new improved landscaping apparatus wherein the same addresses both the problems of ease of use in the snap fitting of a multiple of segments about an associated tree and the like, and effectiveness in construction in effecting such use.

SUMMARY OF THE INVENTION

In view of the foregoing disadvantages inherent in the known types of landscape apparatus now present in the prior art, the present invention provides a landscape apparatus wherein the same is readily and effectively securable in a selective manner about an associated plant base assembly. As such, the general purpose of the present invention, which will be described subsequently in greater detail, is to provide a new and improved landscape apparatus which has all the advantages of the prior art landscape apparatus and none of the disadvantages.

To attain this, the landscape apparatus of the instant invention includes an apparatus including a surrounding shield formed with a central aperture positionable about a central stalk or trunk portion of a shrub or tree growth. The apparatus includes four pie-shaped segments that are interlocked relative to one another utilizing lug members receivable within key-shaped openings of adjacent walls of the pie-shaped segments. The segments includes a floor formed with a matrix of apertures therethrough. Each pie-shaped segment is defined by a perimeter wall defining a cavity with a pie-shaped container segment of complementary configuration received within a forward portion of the cavity, wherein the container segments are defined by a perimeter wall of a height greater than that defined by the pie-shaped segment walls for receiving additional plants therewithin in surrounding relationship relative to a main plant or alternatively receive a fluid fertilizer and the like for treatment of the root system of an associated central plant. Additionally, pie-shaped segment inserts defining an enclosed chamber filled with a mineral oil and the like are positionable within each of the pie-shaped segment cavities for retention of heat during daylight hours and enabling dispensing of the heat during evening hours preventing premature freezing of a root system of an associated plant.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Futher, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved landscape apparatus which has all the advantages of the prior art landscape apparatus and none of the disadvantages.

It is another object of the present invention to provide a new and improved landscape apparatus which may be easily and efficiently manufactured and marketed.

It is a further object of the present invention to provide a new and improved landscape apparatus which is of a durable and reliable construction.

An even further object of the present invention is to provide a new and improved landscape apparatus which is susceptible of a low cost of manufacture with regard to both materials and labor, and which accordingly is then susceptible of low prices of sale to the consuming public, thereby making such landscape apparatus economically available to the buying public.

Still yet another object of the present invention is to provide a new and improved landscape apparatus which provides in the apparatuses and methods of the prior art some of the advantages thereof, while simultaneously overcoming some of the disadvantages normally associated therewith.

Still another object of the present invention is to provide a new and improved landscape apparatus wherein the same is selectively securable in an interlocking manner about a plant stalk or tree trunk for minimizing undesirable growth about the tree, yet enabling efficient and effective watering and fertilization directed to the root system of the associated plant.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top orthographic view of the instant invention.

FIG. 3a is an orthographic side view taken in elevation of the instant invention.

FIG. 3b is an orthographic view taken along the lines 3b—3b of FIG. 3.

FIG. 4 is a top orthographic view of the instant invention with the additional use of segment inserts.

FIG. 4a is an orthographic side view taken in elevation of the invention as illustrated in FIG. 4.

DESCRIPTION OF THE PREFERRED EMBODIMENT

Figure 1:
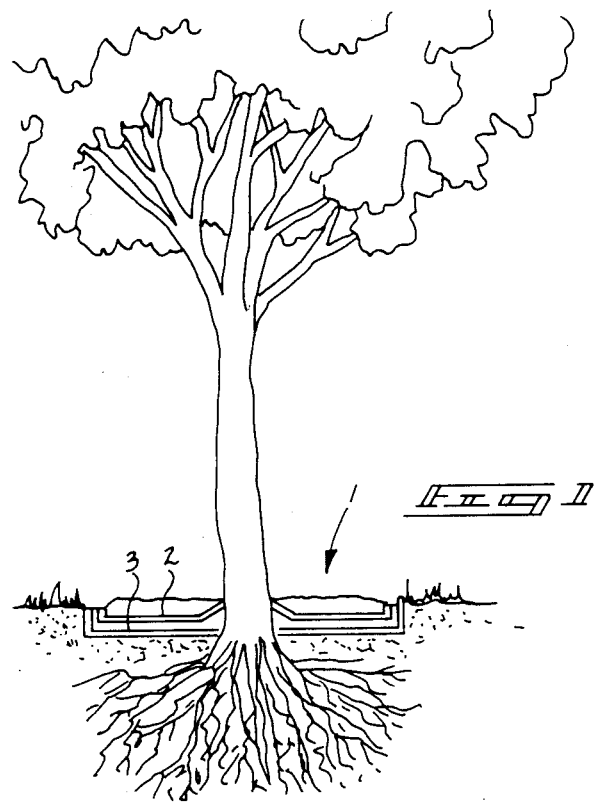
FIG. 1 is an isometric illustration of a prior art device in position about a tree trunk.
Figure 2:
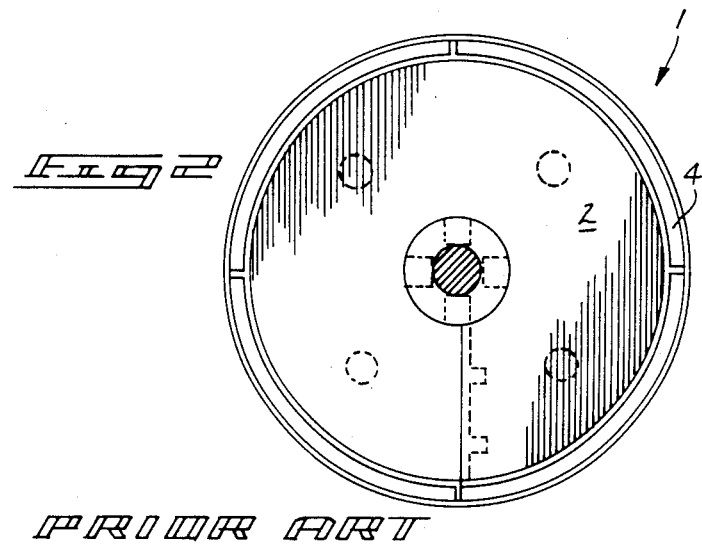
FIG. 2 is a top orthographic view of the prior art device.

With reference now to the drawings, and in particular to FIGS. 1 to 8 thereof, a new and improved landscape apparatus embodying the principles and concepts of the present invention and generally designated by the reference numeral 10 will be described.

FIG. 1 illustrates a prior art device 1 provided with a top floor 2 spaced above a bottom floor 3 with an annular channel 4 formed therebetween to enable directing of fluids, such as fertilizers and the like, to an underlying root system of the associated tree.

More specifically, the landscape apparatus 10 of the instant invention essentially comprises four pie-shaped segments 11, each defining ninety degrees of arc and defined by a first radius with a matrix of water apertures 12 directed through an associated floor 11a of each of the segments 11. The segments are defined by an arcuate forward end 13 defining a convex forward surface wherein securement of the segments together in a circular configuration defines a cylinder 14 medially of the segments. The segments are secured relative to one another wherein a plurality of keyhole apertures 15 are formed through a right side wall of each of the segments, with forwardly extending lug members 17 to be received within the keyhole apertures to fixedly secure these segments together. The lugs are directed through the side wall 16a received within a cooperative side wall 16a of an adjacent segment, as illustrated in FIG. 3 for example. A rear perimeter wall 16 defining a convex arcuate segment defines the rear wall of each of the segments to define a pie-shaped cavity 23 therewithin. It should be noted that the arcuate perimeter walls 16, the sides walls 16a, and the arcuate forward wall 13 are each of an equal and first height.

Reference to FIG. 4 illustrates pie-shaped container segments 18 complementarily received within a forward end of each of the segments 11, wherein the container segments 18 include a wall of a second height greater than that of the first height, and each defining a radius defined by a second radius substantially equal to half of that defined by the first radius of the segments 11. The container segments 18 enable directing of nutrients therethrough and may be formed devoid of any floor to enable directing of fertilizer fluids and the like therethrough, as well as positioning of additional plants within the walls defining the container segments 18.

Figure 5:
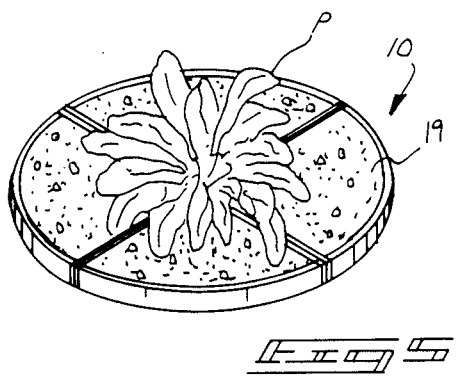
FIG. 5 is an isometric illustration of the instant invention in position about an associated plant.
Figure 6:
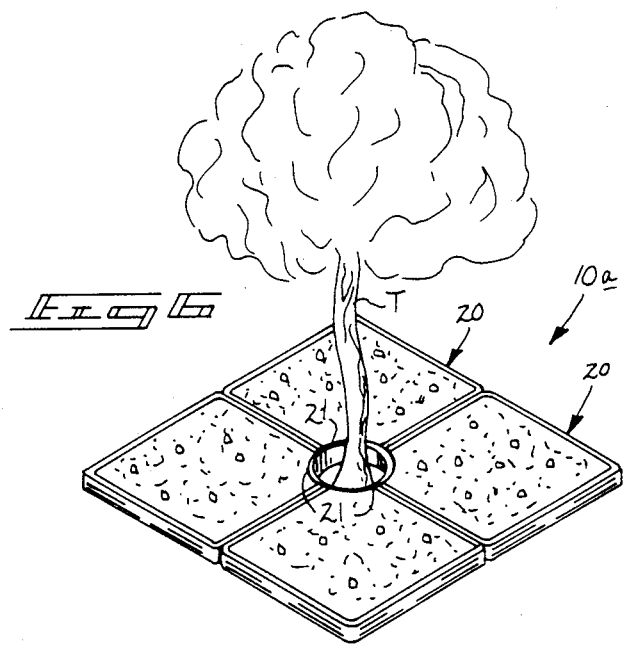
FIG. 6 is an isometric illustration of a modification of the instant invention in securement about a tree trunk.

FIGS. 5 and 6 illustrate the invention secured about an associated plant with a quantity of soil 19 contained within the associated cavities 23 to secure plant "P" medially thereof. FIG. 6 illustrates square segments 20 formed with arcuate concave corners 21, wherein the concave corners define a central opening when the segments are secured together using interlock keyhole apertures and extending lug members, as utilized by the invention, as illustrated in FIG. 3 for example.

Figure 7:
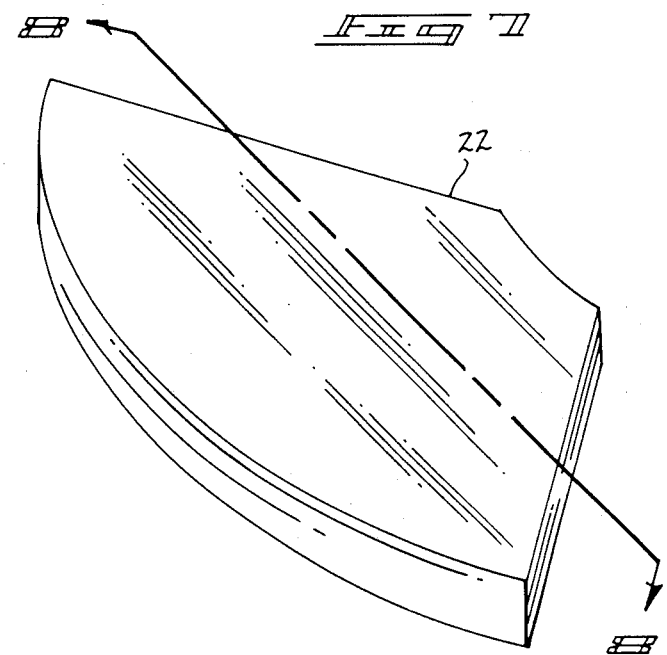
FIG. 7 is an isometric illustration of a segment insert for use by the instant invention.
Figure 8:
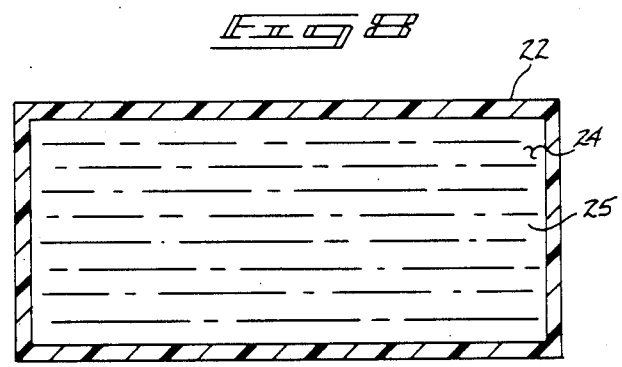
FIG. 8 is an orthographic view taken along the lines 8—8 of FIG. 7 in the direction indicated by the arrows.

FIG. 7 illustrates the use of pie-shaped segment inserts 22 formed with polymeric walls to define an interior enclosed cavity 24 therewithin that is filled with a mineral oil fluid and the like 25, wherein positioning of the segments 22 within the associated cavities 23 of the apparatus 10, heat retention is available to a medially positioned plant, wherein the root system is kept at elevated temperatures to prevent freezing as the fluid 25 will absorb heat directed thereon during daylight hours.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patents of the United States is as follows:

1. A landscape apparatus comprising,
   a series of equally configured, pie-shaped segments, each of the segments including a floor and a perimeter wall portion orthogonally and integrally fixed to the floor about a perimeter defined by the floor, and
   the perimeter wall portion including a forward arcuate concave wall, spaced planar side walls, and a rear arcuate convex wall, and
   securement means formed to each side wall to secure the segments together, and
   wherein the securement means includes a plurality of spaced lug members formed on one of the planar side walls, and a plurality of spaced keyhole apertures formed in the other of the side walls of each of the segments, wherein each of the respective lug members are received within a respective keyhole shaped aperture within an adjacent pie-shaped segment, and
   wherein the segments, when secured in a first position, define a central cylinder defined by the forward arcuate concave walls of each of the segments, and
   wherein the floor of each of the segments includes a matrix of apertures therethrough, and
   wherein each of the pie-shaped segments includes a pie-shaped container segment of complementary configuration defined by a forward portion of each of the pie-shaped segments, wherein the pie-shaped segments are each defined by a first radius and each of the pie-shaped container segments are defined by a second radius equally to substantially half a dimension defined by the first radius, and each of the pie-shaped container segments are defined by a container segment wall defined by a second height, and wherein the perimeter wall of each of the pie-shaped segments are defined by a first height, wherein the second height is substantially greater than that defined by the first height.

2. An apparatus as set forth in claim 1 further including a series of pie-shaped segment inserts defined by an external configuration complementary to that defined by the floor of each of the segments, wherein each of the cavities of each of the pie-shaped segments receives each of the inserts therewithin, and each of the inserts is defined by a flexible wall member defining an internal enclosed cavity, and each of the enclosed cavities are completely filled with a heat retentent fluid.

* * * * *